(12) United States Patent
Solipuram et al.

(10) Patent No.: US 10,215,076 B2
(45) Date of Patent: Feb. 26, 2019

(54) MIXER

(71) Applicant: Eberspächer Exhaust Technology GmbH & Co. KG, Neunkirchen (DE)

(72) Inventors: Vijaya Bhaskar Solipuram, Esslingen (DE); Krishna Kumar Vempati, Esslingen (DE); Enver Kurpejovic, Kirchheim/Teck (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 30 days.

(21) Appl. No.: 15/454,215

(22) Filed: Mar. 9, 2017

(65) Prior Publication Data

US 2017/0260888 A1 Sep. 14, 2017

(30) Foreign Application Priority Data

Mar. 10, 2016 (DE) .................. 10 2016 104 361

(51) Int. Cl.
| | |
|---|---|
| *F01N 3/20* | (2006.01) |
| *F01N 3/28* | (2006.01) |
| *F01N 13/18* | (2010.01) |
| *B01F 5/04* | (2006.01) |
| *B01F 5/06* | (2006.01) |
| *F01N 3/021* | (2006.01) |

(Continued)

(52) U.S. Cl.
CPC ........ *F01N 3/2892* (2013.01); *B01F 3/04049* (2013.01); *B01F 5/0473* (2013.01); *B01F 5/0606* (2013.01); *B01F 5/0688* (2013.01); *F01N 3/021* (2013.01); *F01N 3/103* (2013.01); *F01N 3/2066* (2013.01); *F01N 13/1872* (2013.01); *B01F 2005/0091* (2013.01); *F01N 13/009* (2014.06); *F01N 2240/20* (2013.01); *F01N 2610/02* (2013.01); *F01N 2610/1453* (2013.01); *Y02T 10/24* (2013.01)

(58) Field of Classification Search
CPC ........ F01N 3/021; F01N 3/103; F01N 3/2066; F01N 3/2892; F01N 13/009; F01N 13/1872; F01N 2240/20; F01N 2610/02; F01N 2610/1453; B01F 5/0473; Y02T 10/24
USPC ........................................................ 60/324
See application file for complete search history.

(56) References Cited

U.S. PATENT DOCUMENTS 8,033,104 B2 * 10/2011 Zhang ................. F01N 3/36
60/295
2013/0216442 A1 8/2013 Brunel et al.
(Continued)

FOREIGN PATENT DOCUMENTS

DE 198 20 990 A1 11/1999
DE 10 2013 223033 A1 5/2015
(Continued)

*Primary Examiner* — Audrey K Bradley
(74) *Attorney, Agent, or Firm* — McGlew and Tuttle, P.C.

(57) ABSTRACT

A mixer mixes exhaust gas (A) flowing in an exhaust gas-carrying duct of an internal combustion engine with reactant (R) injected into the exhaust gas-carrying duct. The mixer includes a mixer body (32) with a reactant receiving duct (48), an exhaust gas inlet opening arrangement (70) with a plurality of exhaust gas inlet openings (72, 74, 76, 78, 80) leading to the reactant receiving duct, and at least one release duct (62, 66) leading away from the reactant receiving duct (48) with a release duct opening (64, 66) for the release of a reactant/exhaust gas mixture from the mixer body (32).

20 Claims, 12 Drawing Sheets

(51) Int. Cl.
  F01N 3/10   (2006.01)
  B01F 3/04   (2006.01)
  *F01N 13/00*   (2010.01)
  *B01F 5/00*    (2006.01)

(56) References Cited

U.S. PATENT DOCUMENTS

| | | |
|---|---|---|
| 2014/0196441 A1 | 7/2014 | Katou et al. |
| 2015/0110681 A1* | 4/2015 | Ferront ............... F01N 13/0097 422/168 |
| 2016/0319720 A1* | 11/2016 | Alano ................... F01N 3/2066 |
| 2017/0120193 A1* | 5/2017 | Zhang ................... B01F 5/0485 |
| 2017/0136410 A1* | 5/2017 | Zhang ................ B01D 53/9431 |
| 2017/0254245 A1* | 9/2017 | Zhang .................... F02M 26/19 |

FOREIGN PATENT DOCUMENTS

| | | | |
|---|---|---|---|
| FR | 2 966 197 A1 | 4/2012 | |
| WO | WO 2015012829 A1 * | 1/2015 | ............. F01N 3/208 |
| WO | 2015/187128 A1 | 12/2015 | |

\* cited by examiner

MIXER

CROSS REFERENCE TO RELATED APPLICATIONS

This application claims the benefit of priority under 35 U.S.C. § 119 of German Application DE 10 2016 104 361.3 filed Mar. 10, 2016, the entire contents of which are incorporated herein by reference.

FIELD OF THE INVENTION

The present invention pertains to a mixer for mixing exhaust gas flowing in an exhaust gas duct of an internal combustion engine with reactant injected into the exhaust gas duct.

BACKGROUND OF THE INVENTION

In order to reduce the pollutant emissions in vehicles with diesel drive, a reactant, for example, a urea/water solution, is mixed into the exhaust gas flowing in an exhaust gas-carrying duct of an exhaust system. In order to obtain a good mixing of the reactant, which is injected by means of a reactant injector unit, also generally called an injector, with the exhaust gas, it is known to arrange a mixer, which generally has a plurality of deflecting surfaces arranged inclined toward the exhaust gas flow direction, in the exhaust gas-carrying duct that is arranged downstream of the injection site. The exhaust gas and the reactant impinge on these deflecting surfaces and are deflected there, so that improved mixing is achieved due to the swirling developing in this connection. At the same time, the deflecting surfaces of such a mixer, which are heated by the exhaust gas, support the heating and the evaporation of the reactant impinging thereon and injected in droplet form into the exhaust gas.

SUMMARY OF THE INVENTION

An object of the present invention is to provide a mixer for mixing exhaust gas flowing in an exhaust gas duct of an internal combustion engine with reactant injected into the exhaust gas duct, which mixer brings about a more efficient mixing of the reactant with the exhaust gas.

According to the present invention, this object is accomplished by a mixer for mixing exhaust gas flowing in an exhaust gas-carrying duct of an internal combustion engine with reactant injected into the exhaust gas-carrying duct, comprising a mixer body with
 a reactant receiving duct,
 an exhaust gas inlet opening arrangement with a plurality of exhaust gas inlet openings leading to the reactant receiving duct,
 at least one release duct leading away from the reactant receiving duct with a release duct opening for the release of a reactant/exhaust gas mixture from the mixer body.

The mixer configured according to the present invention has in the mixer body, provided by the reactant receiving duct and the at least one release duct leading away from same, an inner volume area, into which the reactant is injected, namely into the reactant receiving duct, on the one hand, and into which the exhaust gas flowing in an exhaust gas-carrying duct of an exhaust system enters via the exhaust gas inlet opening arrangement, on the other hand. Both during the entry into and during the flowing through the reactant receiving duct and the at least one release duct, the flow direction of the exhaust gas is deflected repeatedly, so that an efficient mixing of the reactant with the exhaust gas is obtained due to this flow deflection during the flowing through the reactant receiving duct and the at least one release duct.

In order to achieve an as uniform as possible release of the mixture of reactant and exhaust gas generated in the mixer body into the part of the exhaust gas-carrying duct arranged downstream in this case, it is suggested that two release ducts lead away from the reactant receiving duct preferably in essentially opposite directions.

The reactant receiving duct may have a reactant receiving end area, into which reactant released by a reactant injection unit can be injected. The reactant flows in the reactant receiving duct to a release end area. The at least one release duct leads away from this release end area of the reactant release duct.

In order to be able to ensure an efficient mixing due to flow deflection in the transition from the reactant receiving duct to the at least one release duct, it is suggested that a flow deflection area be provided for deflecting reactant flowing in the reactant receiving duct towards the exhaust gas release end area or/and exhaust gas into the at least one release duct. When the flow deflection area is arranged essentially between the two release ducts in this case, these may be fluidically uncoupled from one another, on the one hand, and the flow deflection area may be used for flow deflection in association with the two release ducts, on the other hand.

In order to also make possible a release of this mixture from the inner volume area of the mixer body at other locations in addition to the release of the mixture of reactant and exhaust gas in the area of the release opening of the at least one release duct, it is suggested that an outlet opening arrangement be provided with a plurality of outlet openings leading out from the reactant receiving duct or/and the at least one release duct. In this connection, provisions may be made, for example, for a first group of outlet openings to be provided in the transition area from the reactant receiving duct to one of the release ducts and a second group of outlet openings to be provided in the transition area from the reactant receiving duct to the other of the release ducts.

In order to make possible the entry of exhaust gas into the interior space of the mixer body at a plurality of positions as well, it is suggested that the exhaust gas inlet opening arrangement comprise a first group with at least one first exhaust gas inlet opening in a first wall area defining the reactant receiving duct and a second group with at least one second exhaust gas inlet opening in a second wall area defining the reactant receiving duct. A plurality of third exhaust gas inlet openings, for example, may be provided in a third wall area lying between the first wall area and the second wall area and defining the reactant receiving duct.

In order to be able to thereby obtain the greatest quantity of exhaust gas entering in the interior space of the mixer body via the first group and the second group at two wall areas preferably essentially located opposite one another, namely, the first wall area and the second wall area, it is suggested that at least one, preferably each first exhaust gas inlet opening or/and at least one, preferably each second exhaust gas inlet opening have a larger opening cross-sectional area than at least one, preferably each third exhaust gas inlet opening.

For a more improved mixing of the exhaust gas with the reactant, provisions may be made for the exhaust gas inlet opening arrangement in association with at least one, preferably each release duct to have at least one, preferably a plurality of fourth exhaust gas inlet openings. In this case, provisions are preferably made for the at least one fourth exhaust gas inlet opening provided in association with at least one release duct to lead to the release duct in the area of the release duct opening of this release duct.

Provisions are made for the mixer body to comprise an essentially plate-like (plate configuration or plate-shaped) first mixer body part and an essentially plate-like second mixer body part connected to the first mixer body part to be able to configure the mixer body with the inner volume area to be provided therein for providing the reactant receiving duct and the at least one release duct in a simple manner.

For providing the inner volume area, the first mixer body part may comprise a first bulge area defining the reactant receiving duct and a plate area connected to the second mixer body part or/and defining a release duct on both sides of the first bulge area. The second mixer body part may comprise a second bulge area defining the reactant receiving duct and a third bulge area defining the at least one release duct.

The first bulge area may provide the first wall area and the second wall area, which may be arranged essentially located opposite one another, and may provide the third wall area, which is arranged between the first wall area and the second wall area, connecting these wall areas.

The exhaust gas inlet opening arrangement may be provided in the first mixer body part, which is thus a mixer body part to be positioned essentially oriented in an upstream direction. The outlet opening arrangement may be provided in the second mixer body part, which is thus to be positioned in an exhaust gas-carrying duct essentially oriented in a downstream direction.

An overarching area may be provided in the second mixer body part for providing the flow deflection area between the reactant receiving duct and the at least one release duct.

The present invention further pertains to an exhaust system for an internal combustion engine, comprising an exhaust gas-carrying duct, a mixer configured according to the present invention and a reactant injection unit for injecting reactant into the reactant receiving duct of the mixer.

In this connection, provisions are preferably made for the mixer to cover essentially the entire flow cross-sectional area of the exhaust gas-carrying duct in the exhaust gas-carrying duct, so that essentially the entire exhaust gas flowing through the exhaust gas-carrying duct has to flow through the exhaust gas inlet openings formed in the mixer body, either into the interior space of the mixer body or through the mixer body and essentially no flowing around the mixer at the outer circumferential area thereof is made possible.

The mixer is in this connection preferably positioned in the exhaust gas-carrying duct such that the reactant receiving duct or/and the at least one release duct extends essentially at right angles to an exhaust gas flow direction in the exhaust gas-carrying duct. Especially in the case of such an orientation of the reactant receiving duct, it is especially advantageous when the reactant injection unit injects reactant essentially at right angles to the exhaust gas flow direction in the exhaust gas-carrying duct.

In the exhaust system according to the present invention, a diesel oxidation catalytic converter may be provided upstream of the mixer. A catalytic converter, by means of which a selective reduction is carried out even under the action of the reactant mixed into the exhaust gas, may be arranged downstream of the mixer. A particle filter system may also be positioned downstream of the mixer.

Depending on the installation position in a vehicle, the exhaust system according to the present invention may be configured such that an exhaust gas flow direction in the catalytic converter or/and in the particle filter system and an exhaust gas flow direction in the diesel oxidation catalytic converter are directed essentially in the same direction towards one another or are essentially at right angles to one another or are directed essentially opposite one another.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
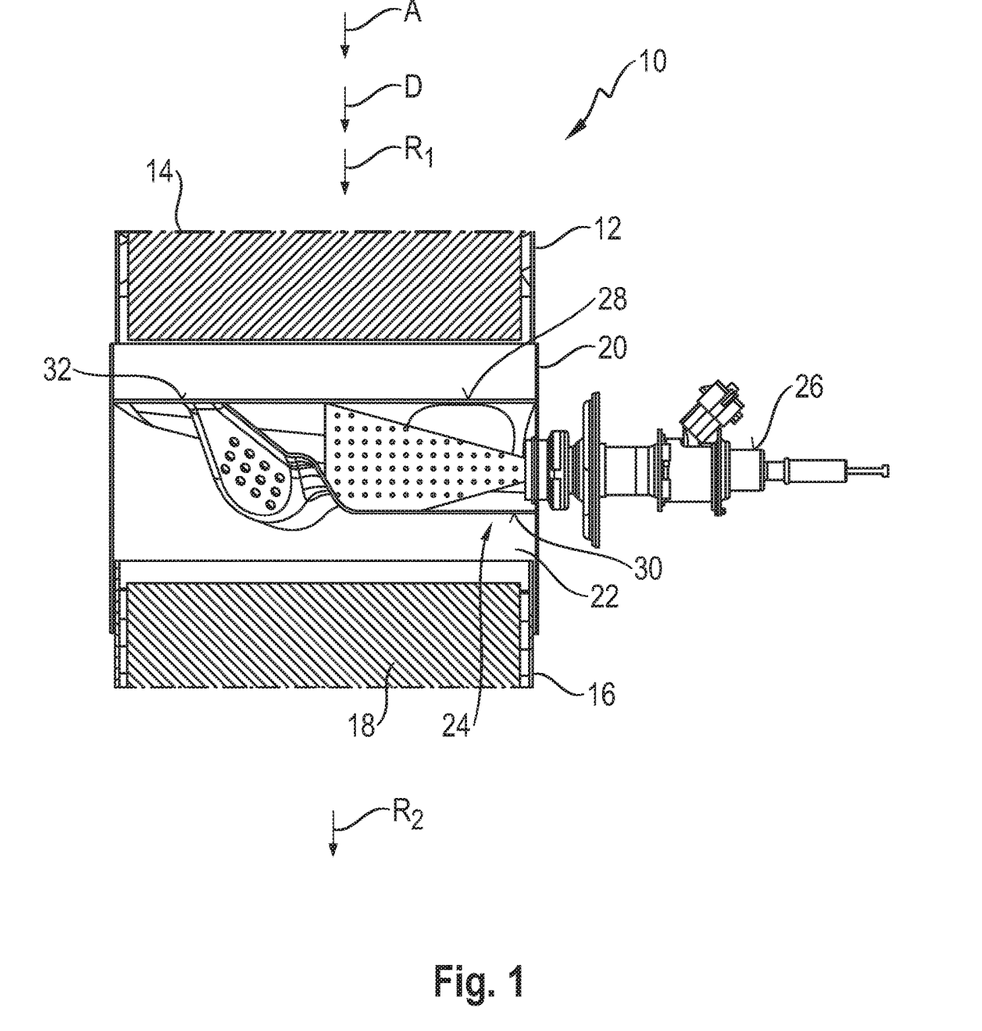
FIG. 1 is a schematic longitudinal sectional view of a section of an exhaust gas-carrying duct formed in an exhaust system with a mixer and a reactant injection unit injecting reactant into the mixer.

Referring to the drawings, FIG. 1 shows a section of an exhaust system, generally designated by 10, of a vehicle internal combustion engine. A diesel oxidation catalytic converter 14, only shown schematically, is arranged in an upstream pipe section 12 of the exhaust system 10 in the exemplary embodiment shown in FIG. 1. A catalytic converter 18 for carrying out a selective reduction is arranged in a downstream pipe section 16 of the exhaust system 10.

A pipe section 20, in which a section of an exhaust gas-carrying duct, generally designated by 22, of the exhaust system 10 is arranged, is provided between the two pipe sections 12, 16. The exhaust gas A flowing in the exhaust system 10 or the exhaust gas-carrying duct 22 essentially flows in the longitudinal direction of the pipe sections 12, 16 and 20 in an exhaust gas flow direction D. It should be pointed out that the exhaust gas flow direction represents the one main flow direction of the exhaust gas A in the exhaust gas-carrying duct 22, over which other local flow direction components, caused by turbulences or flow deflections described below, can be superimposed.

A mixer, which is generally designated by 24 and is described in detail below with reference to FIGS. 2 through 6, is arranged in the pipe section 20 of the exhaust system 10. In association with the mixer 24 is provided a reactant injection unit, which is also called an injector, which is generally designated by 26, which can be fixed, for example, to the pipe section 20 and releases reactant R essentially at right angles to the exhaust gas flow direction D. The reactant R mixed in the exhaust gas by the reactant injection unit 26 may be, for example, a urea/water solution.

Figure 5:
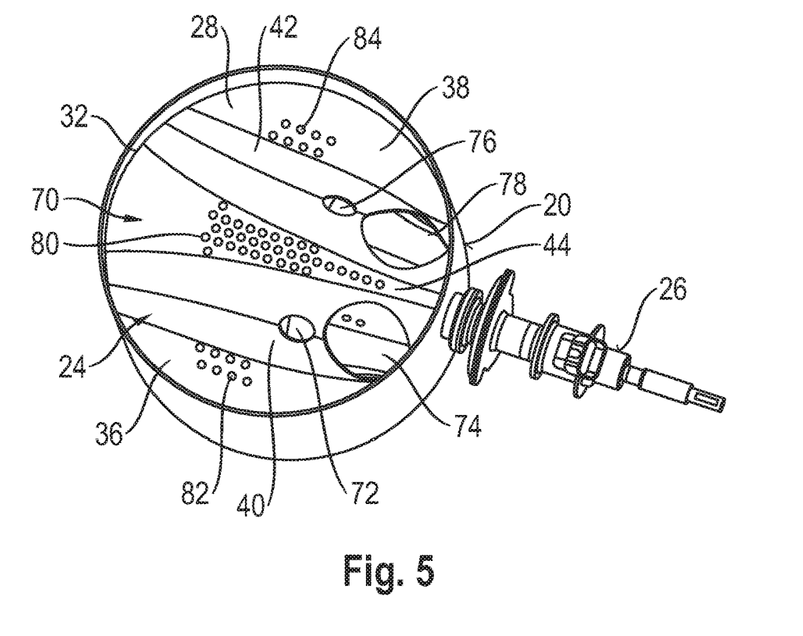
FIG. 5 is a perspective view of a mixer positioned in an exhaust gas-carrying duct, viewed in view direction V in FIG. 4.
Figure 6:
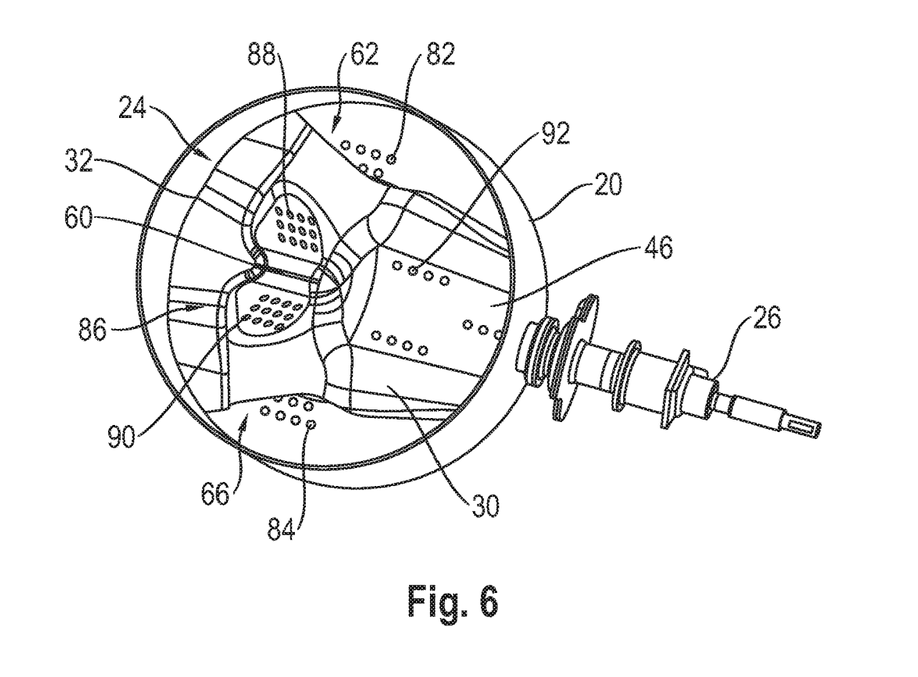
FIG. 6 is a view corresponding to FIG. 5 when viewing the mixer in view direction VI in FIG. 4.
Figure 7:
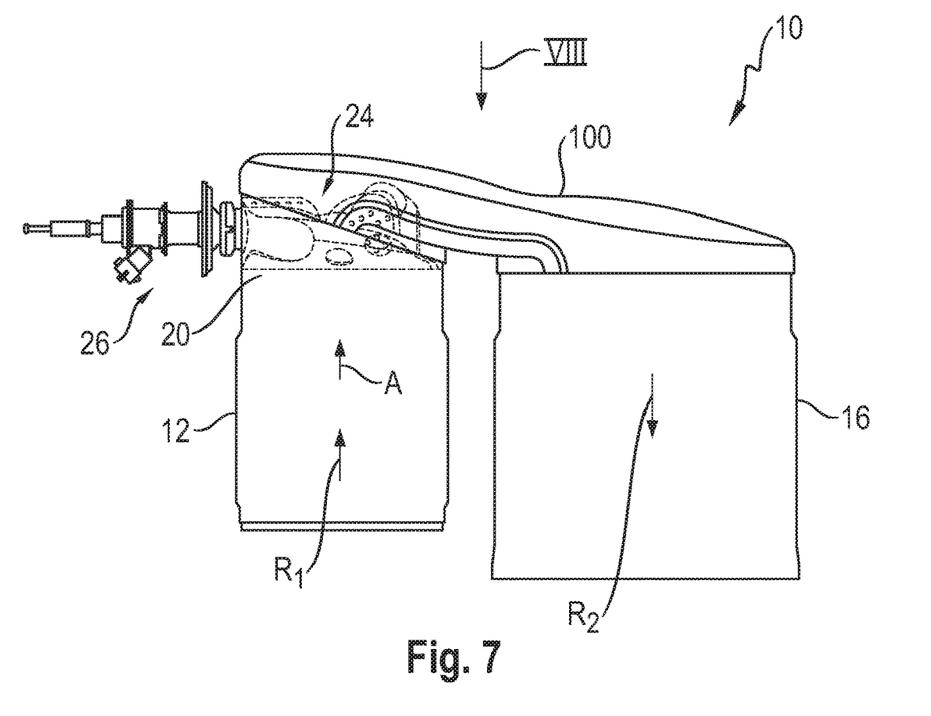
FIG. 7 is a lateral view of an exhaust system.
Figure 8:
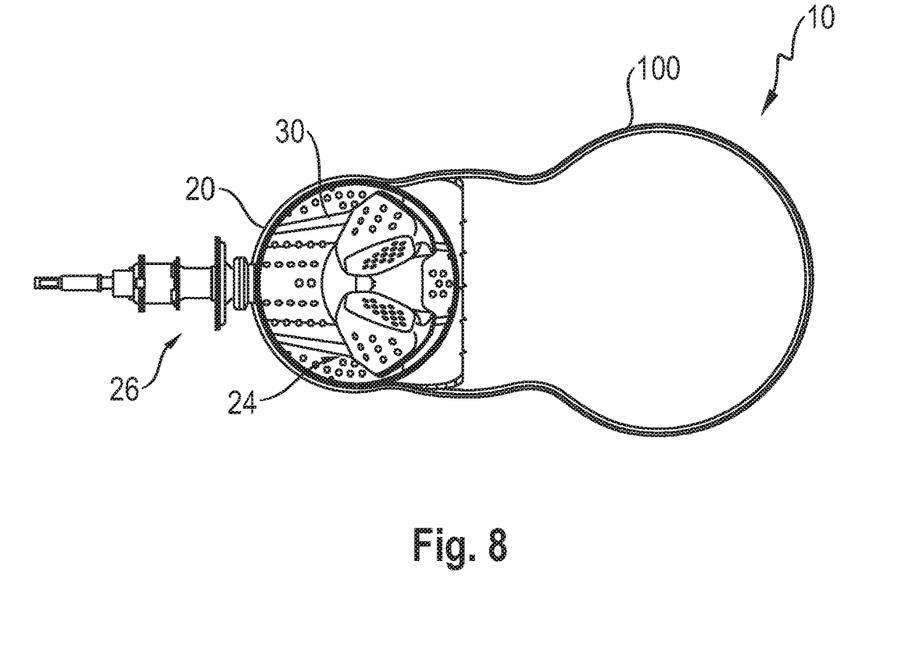
FIG. 8 is a top view of the exhaust system of FIG. 7, viewed in view direction VIII in FIG. 7.
Figure 9:
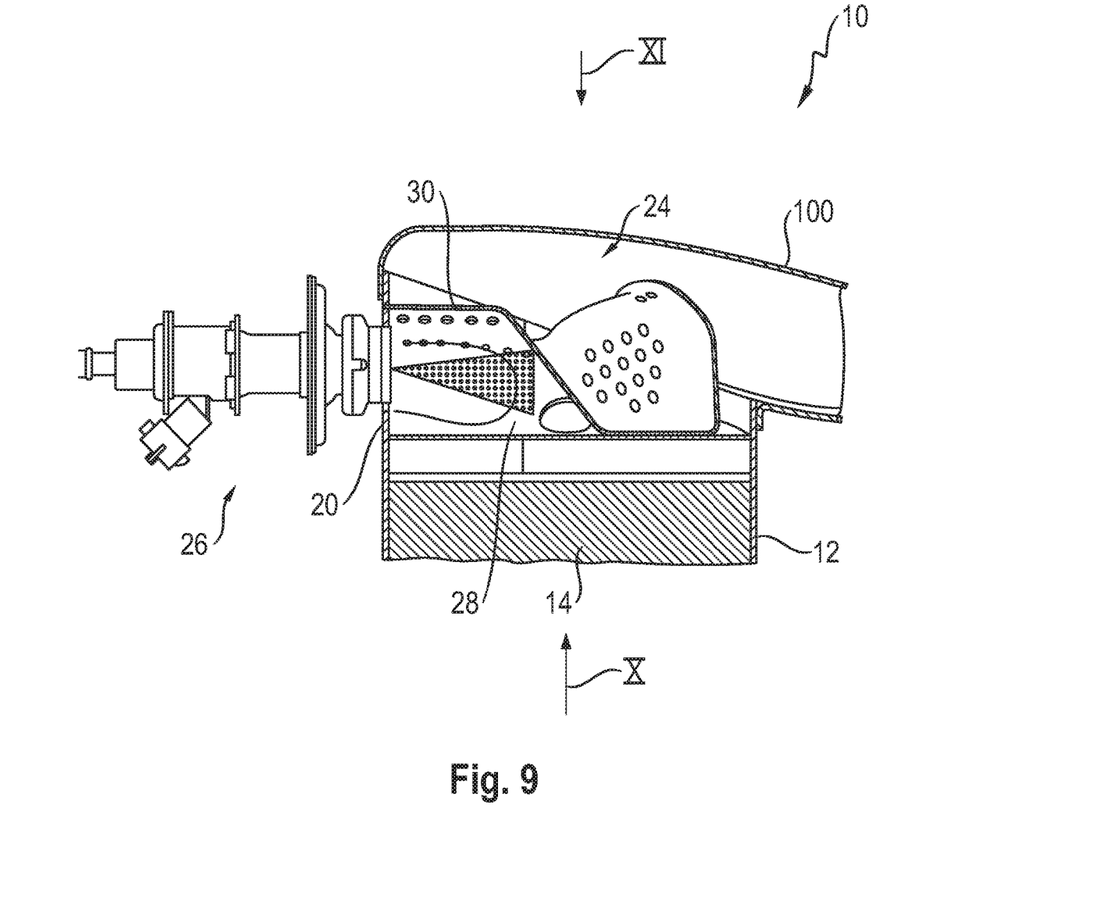
FIG. 9 is an enlarged detail view of the exhaust system of FIG. 7, shown partially cut away.
Figure 10:
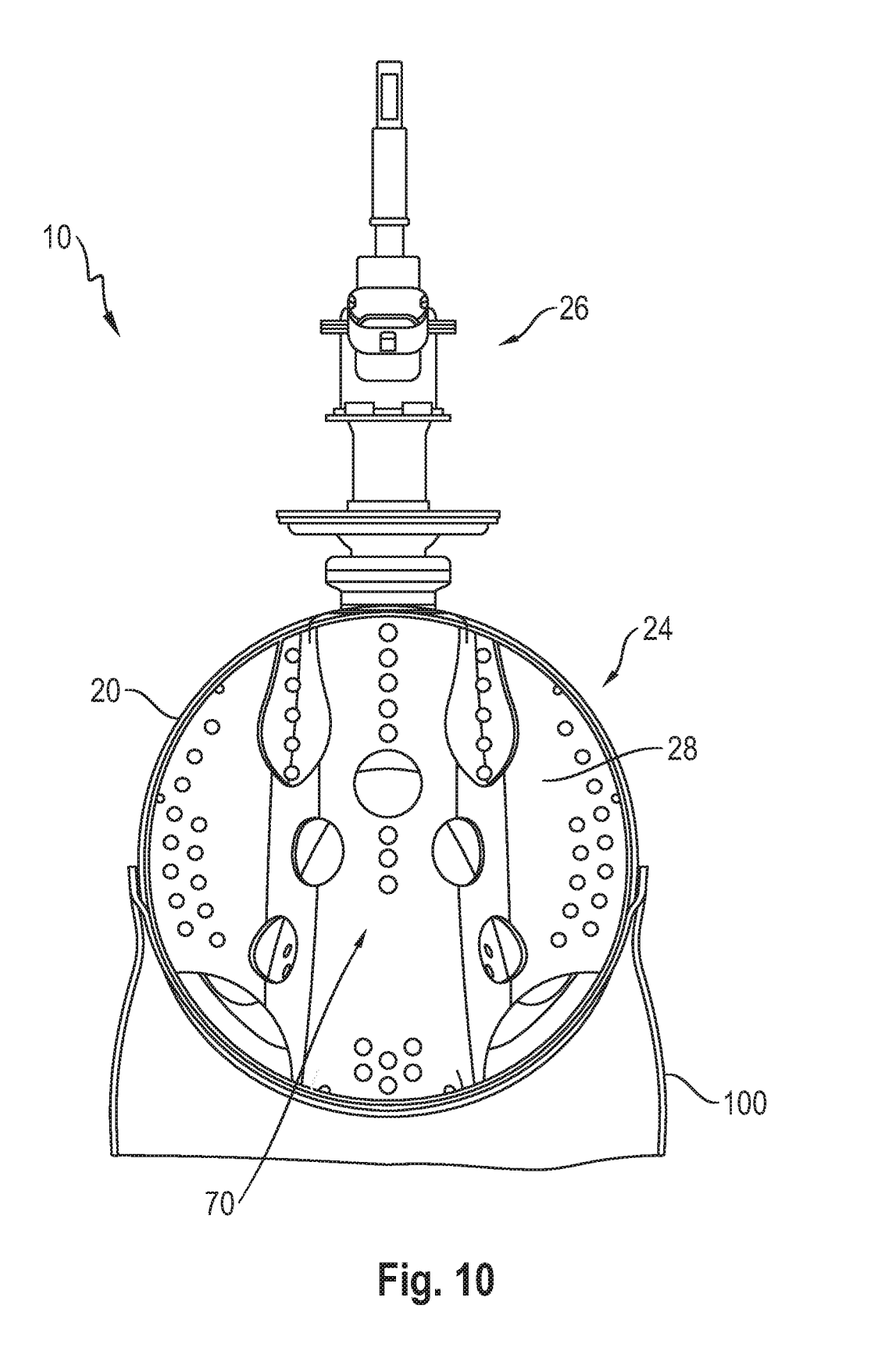
FIG. 10 is a view of the detail of FIG. 9 in view direction X in FIG. 9.
Figure 11:
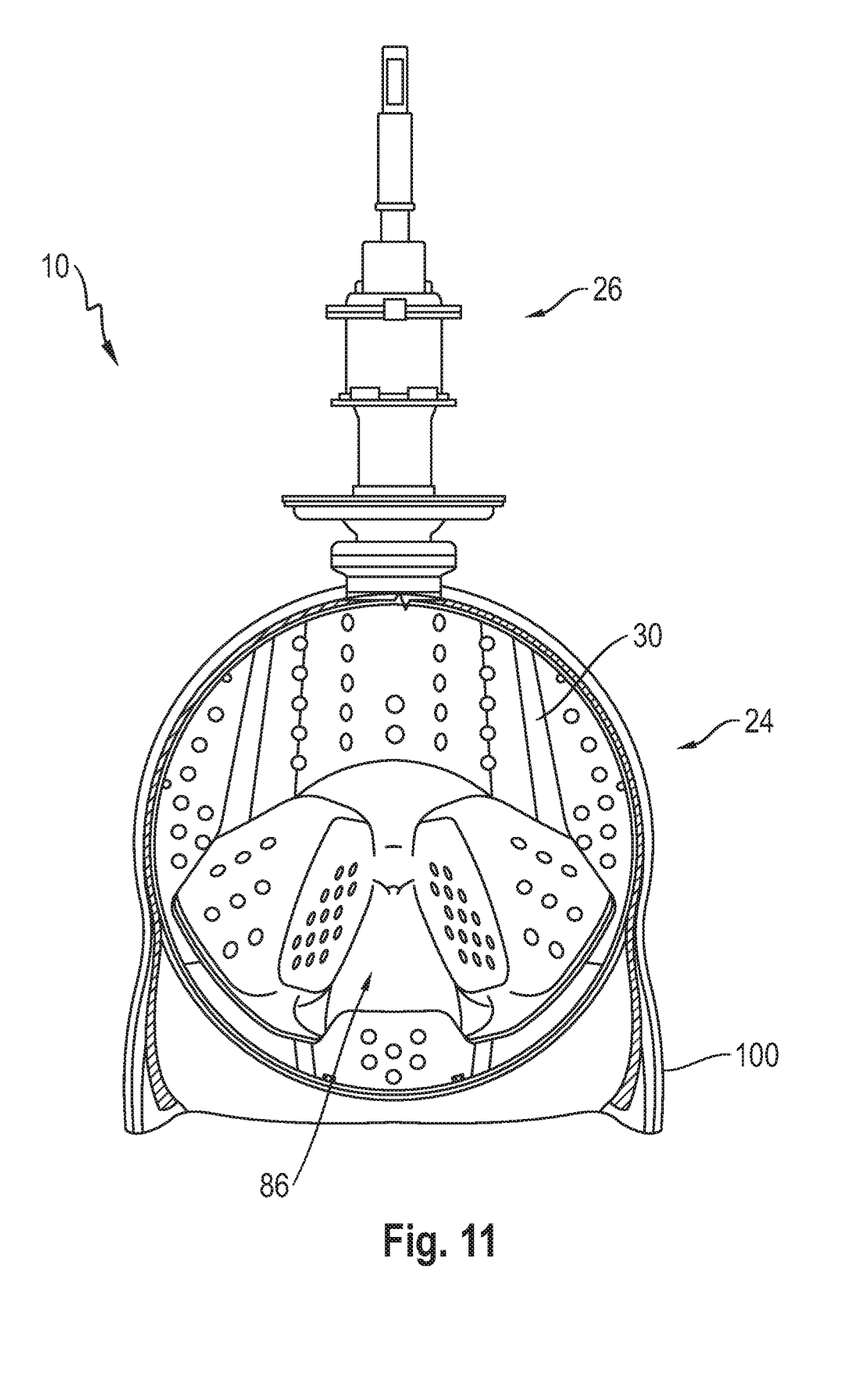
FIG. 11 is a view of the detail of FIG. 9 in view direction XI in FIG. 9.
Figure 12:
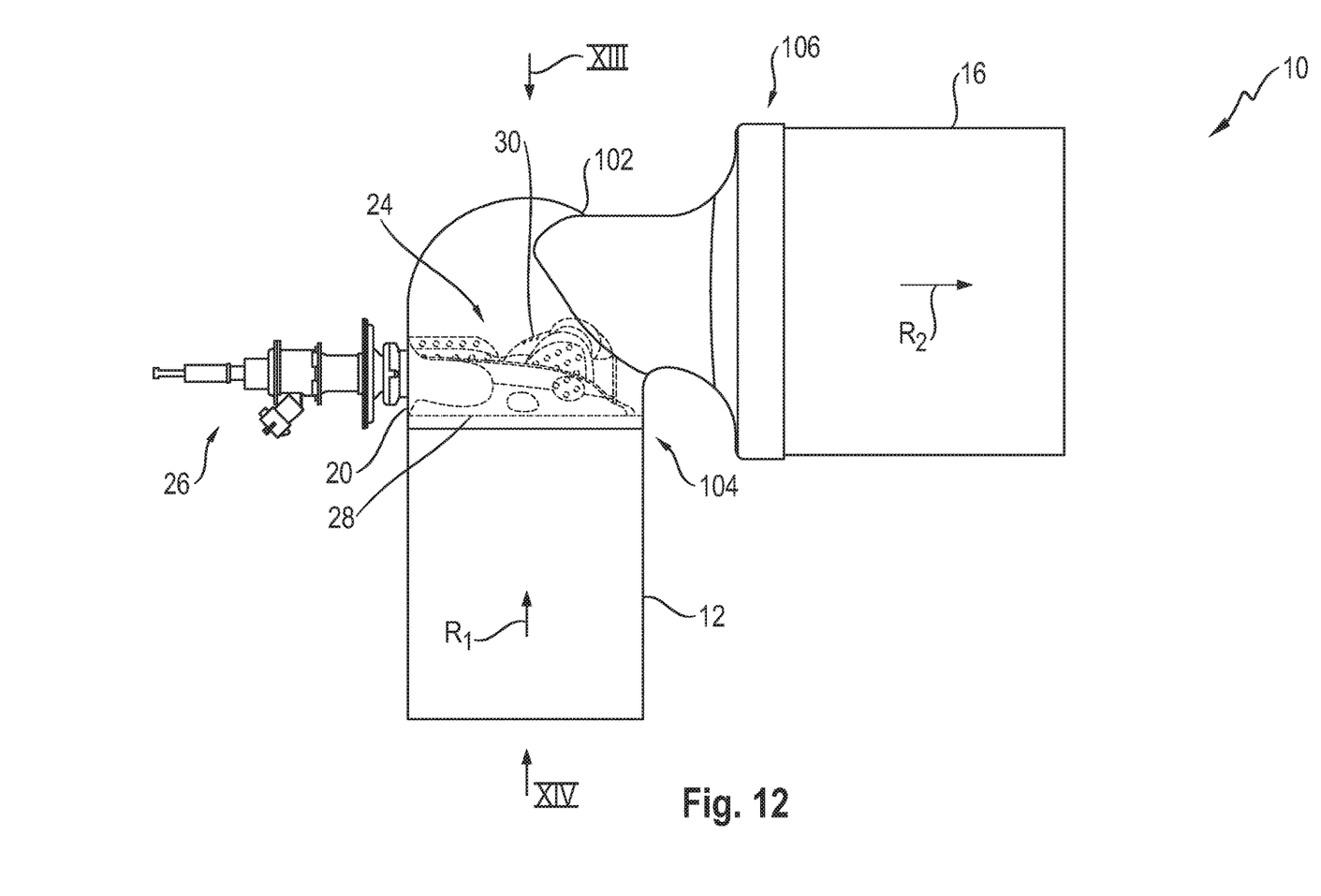
FIG. 12 is a view corresponding to FIG. 7 of an alternative type of embodiment of an exhaust system.
Figure 13:
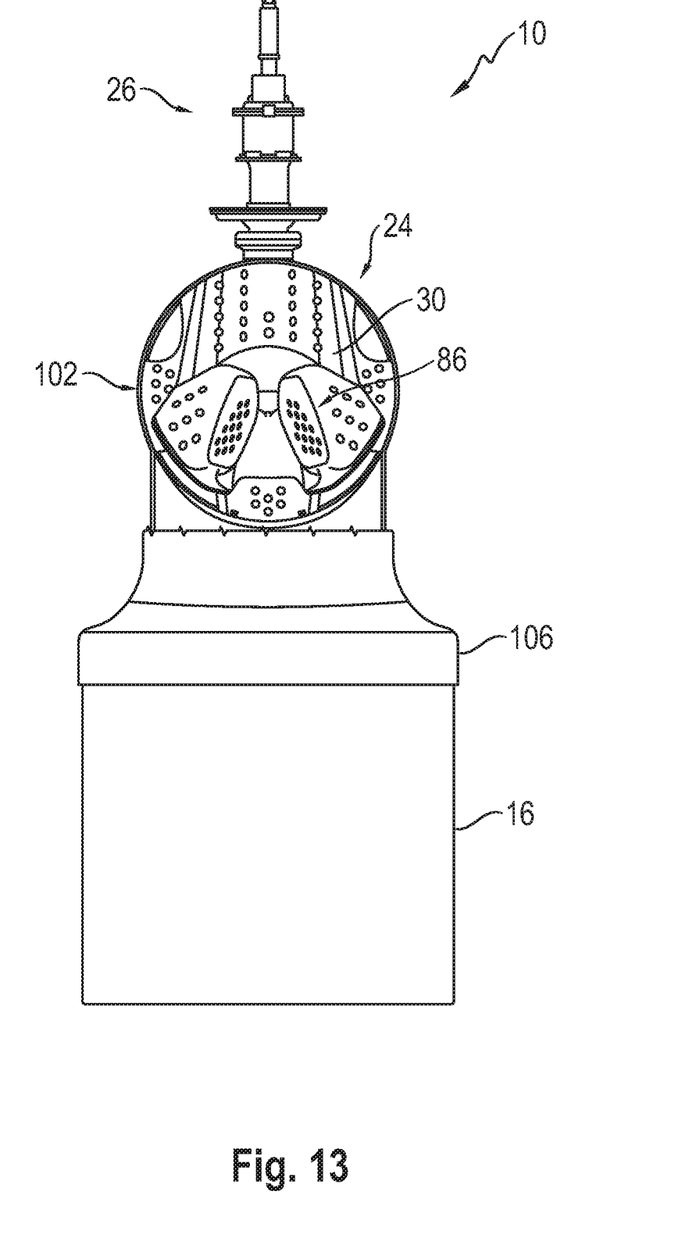
FIG. 13 is a view of the exhaust system of FIG. 12 in view direction XIII in FIG. 12.
Figure 14:
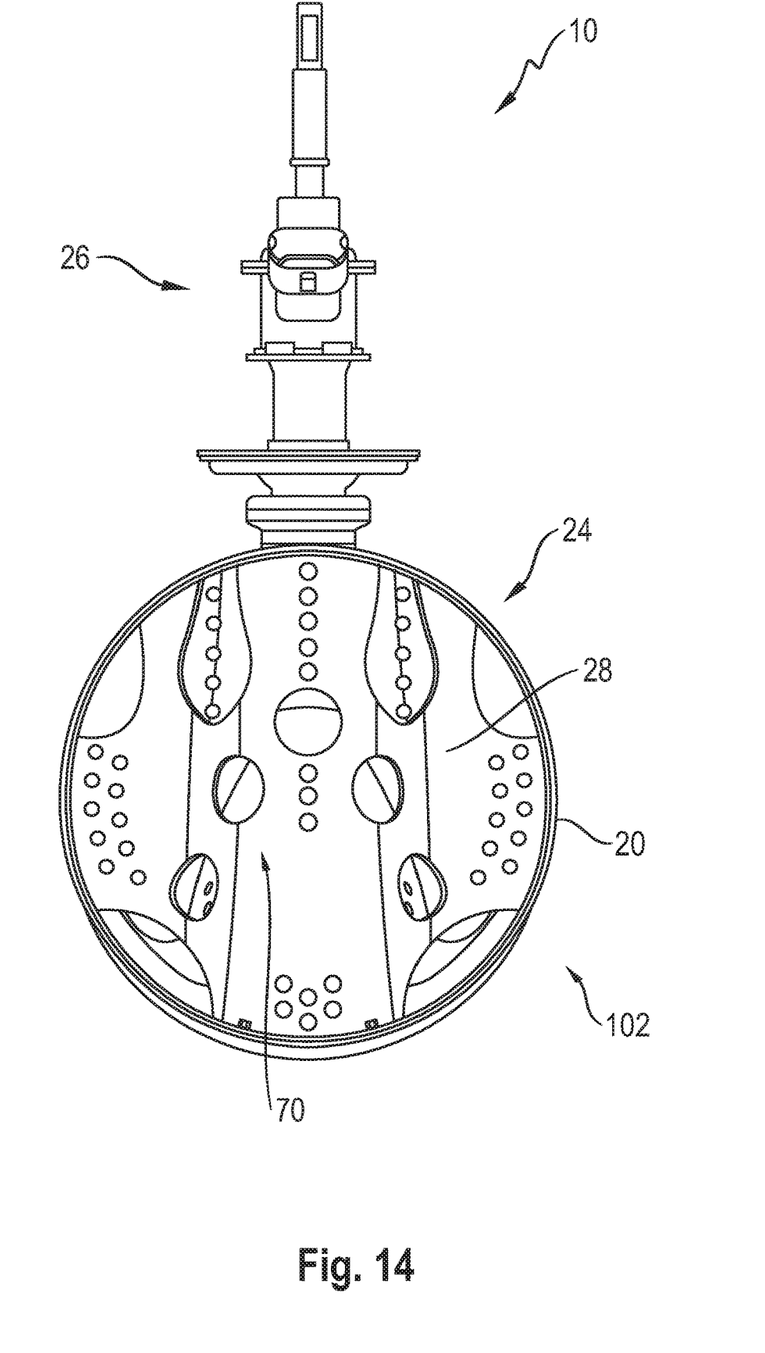
FIG. 14 is a view of the exhaust system of FIG. 12 in view direction XIV in FIG. 12.
Figure 15:
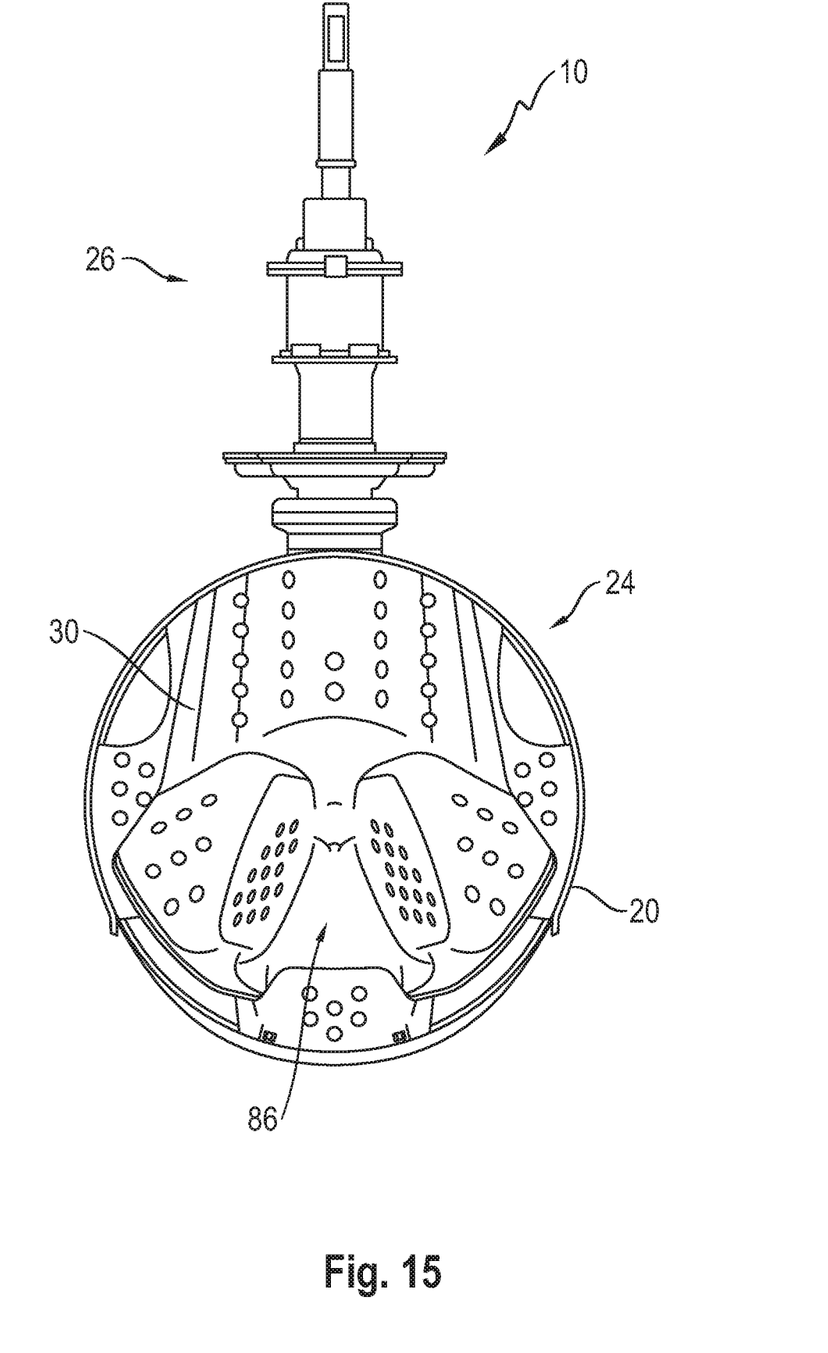
FIG. 15 is another view of the exhaust system of FIG. 12 in view direction XIII in FIG. 12.

The mixer 24 comprises a mixer body 32 configured with two plate-like mixer parts 28, 30. The outer circumferential contour of the mixer body 32 is adapted to the cross-sectional contour of the exhaust gas-carrying duct 22, i.e., it has, for example, a circular geometry in adaptation to the inner cross-sectional geometry of the pipe section 20. As FIGS. 1, 5 and 6 show this, the mixer 24 is positioned in the pipe section 20 such that the mixer body 32 covers essentially the entire inner cross-sectional area of the pipe section 20, but at the outer circumferential area of the mixer body 32 preferably leaves a gap-like intermediate space to the inner surface of the pipe section 20 and exhaust gas can flow around it there. For example, the mixer body 32 may be fixed in the pipe section 20 by welding, for which reason the two mixer body parts 28, 30 to be fixed to one another, for example, also by welding, are advantageously provided as shaped sheet metal parts.

The first mixer body part 28, to be positioned oriented in the upstream direction in the exhaust gas-carrying duct 22, i.e., oriented facing the diesel oxidation catalytic converter 14, has a first bulge area 34 extending essentially beyond this first mixer body part 28. Two essentially flat plate areas 36, 38 are provided on both sides of this first bulge area 34. The first bulge area 34 is configured with two first and second wall areas 40, 42, which are essentially located opposite one another and lead out of the plane defined by the plate areas 36, 38 and a third wall area 44 connecting the first and second wall areas. The height of the first and second wall areas 40, 42 and thus also the height of the first bulge area 34 may vary essentially transversely to the exhaust gas flow direction A beyond the first mixer body part 28.

In association with the first bulge area 34, a second bulge area 46 is provided in the second mixer body part 28. These two bulge areas 34, 46 together border a reactant receiving duct 48 that extends in the mixer body 32 from a reactant receiving end area 50 located on the right-hand side in FIG. 3 to a release end area 42 located further on the left-hand side in FIG. 3.

Two third bulge areas 54, 56, which are oriented essentially transversely to the second bulge area 46, are provided in the second mixer body part 30. An overarching area 60 providing a flow deflection area 58 is formed between the two third bulge areas 54, 56.

A release duct 62, which is open to the outside via a release opening 64, is defined between the third bulge area 54 of the second mixer body part 30 and the plate area 36 of the first mixer body part 28. Correspondingly, a release duct 66, which is open to the outside via a release opening 68, is defined between the third bulge area 56 of the second mixer body part 30 and the plate area 38 of the first mixer body part 28. The two release ducts 62, 66 thus lead away from the reactant receiving duct 48 or the release end area 52 thereof essentially transversely to a longitudinal extension direction of the reactant receiving duct between the reactant receiving end area 50 thereof and the release end area 52 thereof and are essentially separated from each other by the flow deflection area 58 or the overarching area 60 providing same. By positioning the mixer 24 in the pipe section 20 in the manner shown in FIG. 5 and FIG. 6, the reactant receiving duct 48 extends, starting from its reactant receiving end area 50 positioned adjacent to the pipe section 20, essentially at right angles to the exhaust gas flow direction D in the exhaust gas-carrying duct 22. Correspondingly, the two release ducts 62, 66 extending away from the reactant receiving duct 48 essentially transversely and in opposite direction to each other also extend essentially at right angles to the exhaust gas flow direction D in the exhaust gas-carrying duct 22. The reactant injection unit 26 injects the reactant R in the form of a spray cone shown in FIG. 1 with a reactant flow direction essentially at right angles to the exhaust gas flow direction D in the reactant receiving duct 48 in the direction towards the release end area 52.

In order to make possible the entry of exhaust gas A flowing towards the mixer 24 in the exhaust gas flow direction D into the interior of the mixer body 32 essentially comprising the reactant receiving duct 48 and the two release ducts 54, 56, an exhaust gas inlet opening arrangement, generally designated by 70, is formed at the first mixer body part 28 to be provided in the upstream direction. The exhaust gas inlet opening arrangement 70 comprises in the first wall area 40 a first group with two first exhaust gas inlet openings 72, 74, of which, for example, the larger first exhaust gas inlet opening 74 located closer to the reactant receiving end area 50 may extend up to into the third wall area 44. A second group with two second exhaust gas inlet openings 76, 78 is provided in the second wall area 42 essentially located opposite the first wall area 40, wherein the configuration of the second exhaust gas inlet openings 76, 78 may be essentially symmetrical to the configuration of the first exhaust gas inlet openings 72, 74. The larger second exhaust gas inlet opening 78 may extend up to into the area of the third wall area 44 here as well.

The exhaust gas inlet opening arrangement 70 may further comprise a plurality of third exhaust gas inlet openings 80 in the third wall area 44, i.e., the wall area of the first bulge area 34 which defines the reactant receiving duct 48 essentially in the upstream direction. These third exhaust gas inlet openings may extend distributed over the entire length of the reactant receiving duct 48 and generally have a markedly smaller opening cross-sectional area than the first exhaust gas inlet openings 72, 74 and the second exhaust gas inlet openings 76, 78.

A plurality of fourth exhaust gas inlet openings in association with the two release ducts 62, 66 or the release openings 64, 68 thereof each are provided on both sides of the first bulge area 34, i.e., essentially in the plate areas 36, 38. The exhaust gas inlet openings 82 provided in association with the release duct 62 lie essentially in the area of the release opening 64 of same, may be positioned partly still in the section of the plate area 36 defining the release duct 62, but may also be partly positioned outside the plate area 36. The same applies to the fourth exhaust gas inlet openings 84 provided in association with the release duct 66.

An outlet opening arrangement 86, clearly visible in FIG. 6, is provided in the second mixer body part 30. This outlet opening arrangement 86 comprises a plurality of outlet openings 88, 90 at the overarching area 60 both in association with the release duct 62 and in association with the release duct 66 and comprises outlet openings 92 in the second bulge area 46 defining the reactant receiving duct 48 in the downstream direction.

Figure 2:
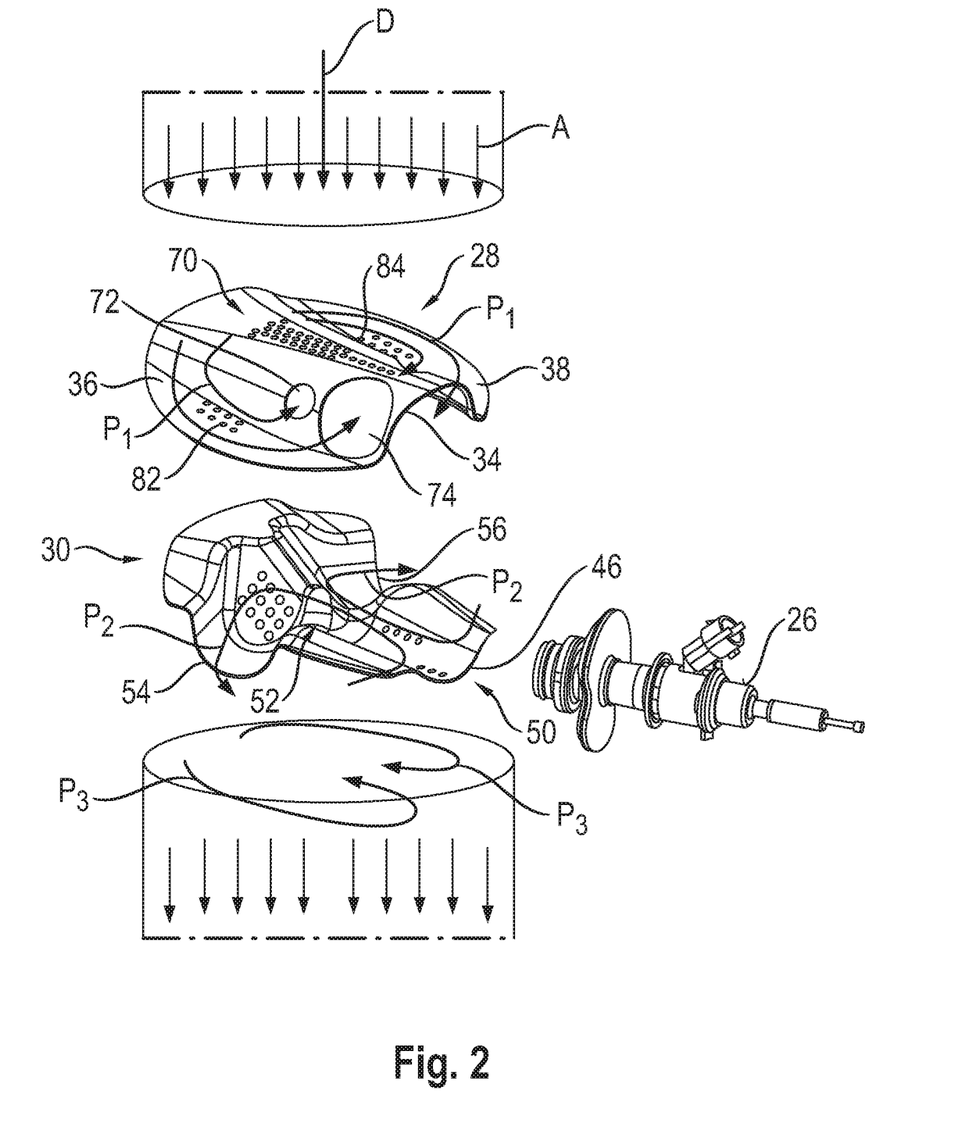
FIG. 2 is an exploded view of the components of an exhaust system according to FIG. 1.
Figure 3:
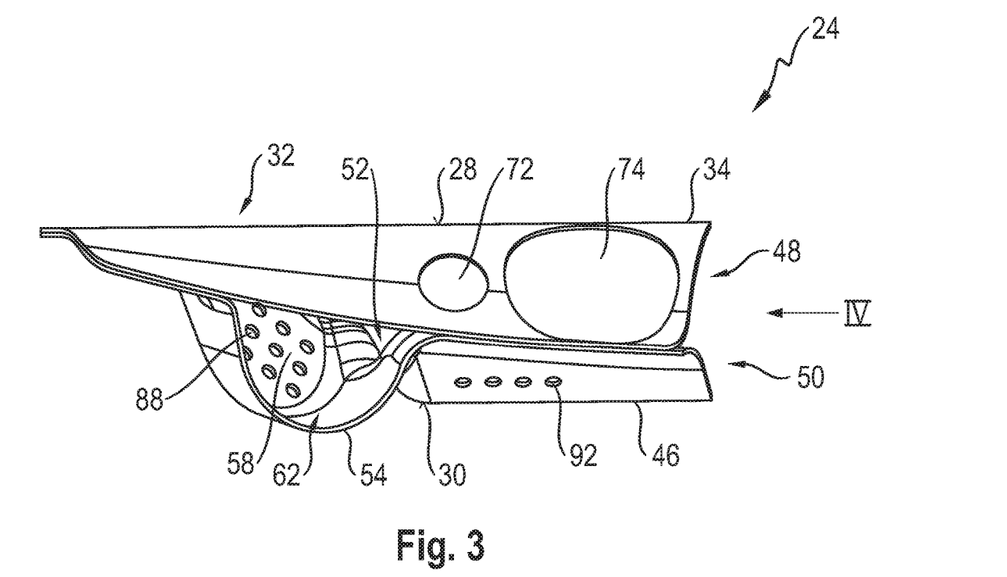
FIG. 3 is a lateral view of the mixer of the exhaust system of FIG. 1, viewed in view direction III in FIG. 4.
Figure 4:
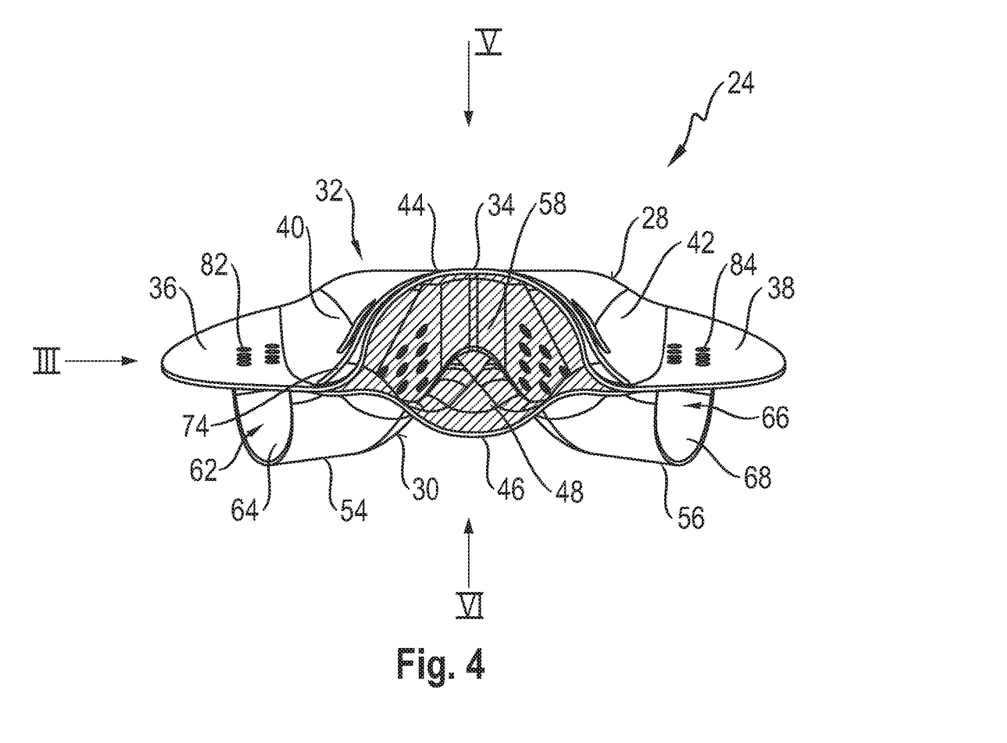
FIG. 4 is a lateral view of the mixer of the exhaust system of FIG. 1, viewed in view direction IV in FIG. 3.

Exhaust gas A flowing from upstream in the exhaust gas flow direction D towards the mixer 24 can flow around the mixer body 32 on its outer circumferential area because of the fitting of the mixer 24 in the pipe section 20. Nevertheless, most of the exhaust gas A flowing to be flowed at first in the exhaust gas flow direction A towards the mixer 24 will enter into the reactant receiving duct 48 through the first exhaust gas inlet openings 72, 74 and the second exhaust gas inlet openings 76, 78, i.e., essentially close to the reactant receiving end area 50 of the reactant receiving duct 48. To this end, the exhaust gas A, as shown by flow arrows P1 in FIG. 2, is deflected. The exhaust gas A entering into the reactant receiving duct 48 close to the reactant receiving end area 50 thereof flows through the reactant receiving duct 48 in the direction from the reactant receiving end area 50 to the release end area 52 or the flow deflection area 58 provided there. In this case, the exhaust gas A takes along the reactant injected by the reactant injection unit 26 into the reactant receiving duct 48 essentially in the same flow direction. At the release end area 52, the exhaust gas A carrying along the reactant R impinges on the flow deflection area 58 and is deflected in the direction towards the two release ducts 62, 66, as illustrated by flow arrows P2 in FIG. 2. The mixture of exhaust gas A and reactant R is released from the release ducts 62, 66 at the two release openings 64, 68 oriented opposite one another and is at first swirled even further, as illustrated by flow arrows P3 in FIG. 2, before it essentially again flows in the exhaust gas flow direction D towards the catalytic converter 18.

A part of the exhaust gas A enters into the reactant receiving duct 48 via the third exhaust gas inlet openings 80, which leads to an increased swirling of the mixture of exhaust gas A and reactant R already flowing therein. Correspondingly, the exhaust gas A flowing through the first mixer body part 28 via the fourth exhaust gas inlet openings 82, 84 in the area of the release openings 64, 68 also leads to an increased swirling or flow deflection of the mixture of reactant R and exhaust gas A being released from the release openings 64, 68. A part of this mixture may also be released through the outlet openings 88, 90 at the flow deflection area 58 or the outlet areas 92 at the second bulge area 46.

The mixer 24 shown in the figures and described in detail above may be varied in very different areas, without deviating from the principles of the present invention. Thus, for example, the two plate areas 36, 38 could have bulge areas wherever they co-define the release ducts 62, 66, in order to increase the flow cross section of the release ducts 62, 66. The release ducts 62, 66 could also be provided exclusively by such bulges of the first mixer body part 28 and could be defined by essentially flat plate areas of the second mixer body part 30. The number of openings of the inlet opening arrangement 70 and of the outlet opening arrangement 86 may deviate from the number shown in the figures. Also, no inlet openings might be formed, for example, in the third wall area 44. Likewise, no outlet openings could be provided in the second bulge area 46.

FIGS. 7-15 show alternative embodiments of an exhaust system 10 designed with a mixer 24 which is configured according to the present invention. While the exhaust gas flow direction $R_1$ upstream of the mixer 24, i.e., e.g., the exhaust gas flow direction arriving essentially in the diesel oxidation catalytic converter 14, is essentially aligned to an exhaust gas flow direction $R_2$ arriving downstream of the mixer 24 in the embodiment of an exhaust system 10 shown in FIG. 1, the exhaust gas thus flows through these two system areas in essentially the same main flow direction; these two flow direction in $R_1$, $R_2$ are essentially directed opposite to one another in the exemplary embodiment of an exhaust system 10 shown in FIGS. 8-11.

A connection housing, which is generally designated by 100, which connects to the pipe section 20 containing the mixer 24 or at least partly also provides same, may be provided between the two pipe sections 12, 16. The exhaust gas A leaving the mixer 24 is deflected approx. by 90° in relation to the exhaust gas flow direction $R_1$, flows through the connection housing and is again deflected by approx. 90° upon entry into the pipe section 16, so that in the pipe section 16 the exhaust gas flow direction $R_2$ is directed approximately opposite the exhaust gas flow direction $R_1$ in the pipe section 12. Thus, an essentially folded overall structure of the exhaust system 10 is obtained.

FIGS. 12-15 show a configuration, in which the exhaust gas flow direction $R_1$, upstream of the mixer 24 and flow direction $R_2$ downstream of the mixer 24 are essentially at right angles to one another. A connection housing 102 also providing, for example, the pipe section 20 containing the mixer 24 has connection areas 104, 106 for the pipe sections 12 and 16, respectively.

The exhaust gas leaving the mixer 24 is deflected approx. by 90° in relation to the exhaust gas flow direction $R_1$ in the connection housing 102 and also enters into the pipe section 16 in this direction. Thus, an essentially angular overall structure of the exhaust system 10 is obtained.

Finally, it should be pointed out that the above-mentioned exhaust gas flow directions $R_1$, $R_2$ designate each the main flow directions arriving in said system. This does not rule out that flow directions deviating locally from these main flow directions may occur in these system areas.

While specific embodiments of the invention have been shown and described in detail to illustrate the application of the principles of the invention, it will be understood that the invention may be embodied otherwise without departing from such principles.

What is claimed is:

1. An exhaust gas mixer for mixing exhaust gas, flowing in an exhaust gas-carrying duct of an internal combustion engine, with reactant injected into the exhaust gas-carrying duct, the mixer comprising a mixer body comprising:
   a reactant receiving duct;
   an exhaust gas inlet opening arrangement with a plurality of exhaust gas inlet openings leading to the reactant receiving duct;
   a first release duct leading away from the reactant receiving duct, the first release duct comprising a release duct opening for the release of a reactant/exhaust gas mixture from the mixer body; and
   a second release duct leading away from the reactant receiving duct to provide two release ducts leading away from the reactant receiving duct in opposite directions, the reactant receiving duct having a reactant receiving end area and a release end area and the release ducts leading away from the reactant receiving duct in the release end area, wherein a flow deflection area is provided in the release end area, the flow deflection area deflecting reactant and exhaust gas flowing in the reactant receiving duct towards the release end area in opposite directions into the two release ducts.

2. A mixer in accordance with claim 1, wherein the flow deflection area is essentially arranged between the two release ducts.

3. A mixer in accordance with claim 1, wherein an outlet opening arrangement is provided with a plurality of outlet openings leading out of the reactant receiving duct or leading out of at least one of the release ducts or both leading out of the reactant receiving duct and leading out of at least one of the release ducts.

4. A mixer in accordance with claim 1, wherein a first group of outlet openings is provided in a transition area from the reactant receiving duct to one of the two release ducts and a second group of outlet openings is provided in the transition area from the reactant receiving duct to the other of the release ducts.

5. A mixer in accordance with claim 1, wherein the mixer body comprises an essentially plate-shape first mixer body part and an essentially plate-shape second mixer body part connected to the first mixer body part and an overarching area providing the flow deflection area is provided in the second mixer body part.

6. A mixer in accordance with claim 1, wherein the mixer body comprises an essentially plate-shape first mixer body part and an essentially plate-shape second mixer body part connected to the first mixer body part.

7. A mixer in accordance with claim 6, wherein:
the first mixer body part comprises a first bulge area defining the reactant receiving duct and on both sides of the first bulge area a plate area connected to the second mixer body part and defining the release ducts on both sides of the first bulge area; or
the second mixer body part comprises a second bulge area defining the reactant receiving duct and a third bulge area defining one of the release ducts; or
the first mixer body part comprises a first bulge area defining the reactant receiving duct and on both sides of the first bulge area a plate area connected to the second mixer body part and defining the release ducts on both sides of the first bulge area and the second mixer body part comprises a second bulge area defining the reactant receiving duct and a third bulge area defining one of the release ducts.

8. A mixer in accordance with claim 1, wherein the exhaust gas inlet opening arrangement comprises:
a first group with at least one first exhaust gas inlet opening in a first wall area of the mixer body defining the reactant receiving duct;
a second group with at least one second exhaust gas inlet opening in a second wall area of the mixer body defining the reactant receiving duct; and
at least one third exhaust gas inlet opening in a third wall area lying between the first wall area and the second wall area and defining the reactant receiving duct.

9. A mixer in accordance with claim 8, wherein the at least one first exhaust gas inlet opening or the at least one second exhaust gas inlet opening or both the at least one first exhaust gas inlet opening and the at least one second exhaust gas inlet opening has a larger opening cross-sectional area than the at least one third exhaust gas inlet opening.

10. A mixer in accordance with claim 8, wherein the exhaust gas inlet opening arrangement further comprises at least one fourth exhaust gas inlet opening in association with at least one of the release ducts.

11. A mixer in accordance with claim 10, wherein the at least one fourth exhaust gas inlet opening, provided in association with at least one of the release ducts, leads to the at least one release duct.

12. A mixer in accordance with claim 8, wherein:
the mixer body comprises an essentially plate-shaped first mixer body part and an essentially plate-shaped second mixer body part connected to the first mixer body part;
the first mixer body part comprises a first bulge area defining the reactant receiving duct and on both sides of the first bulge area a plate area connected to the second mixer body part and defining the release ducts on both sides of the first bulge area; and the first bulge area provides the first wall area, the second wall area and the third wall area.

13. A mixer in accordance with claim 12, wherein
the exhaust gas inlet opening arrangement is provided in the first mixer body part; or
an outlet opening arrangement is provided in the second mixer body part, the outlet opening arrangement being provided with a plurality of outlet openings leading out of the reactant receiving duct or leading out of at least one of the release ducts or both leading out of the reactant receiving duct and leading out of at least one of the release ducts; or
the exhaust gas inlet opening arrangement is provided in the first mixer body part and the outlet opening arrangement is provided in the second mixer body part.

14. An exhaust system for an internal combustion engine, the exhaust system comprising:
an exhaust gas-carrying duct;
a mixer comprising a mixer body comprising:
a reactant receiving duct;
an exhaust gas inlet opening arrangement with a plurality of exhaust gas inlet openings leading to the reactant receiving duct;
a first release duct leading away from the reactant receiving duct, the first release duct comprising a release duct opening for the release of a reactant/exhaust gas mixture from the mixer body; and
a second release duct leading away from the reactant receiving duct to provide two release ducts leading away from the reactant receiving duct in opposite directions, the reactant receiving duct having a reactant receiving end area and a release end area and the release ducts leading away from the reactant receiving duct in the release end area, wherein a flow deflection area is provided in the release end area, the flow deflection area deflecting reactant and exhaust gas flowing in the reactant receiving duct towards the release end area in opposite directions into the two release ducts; and
a reactant injection unit for injecting reactant into the reactant receiving duct of the mixer.

15. An exhaust system in accordance with claim 14, wherein:
the mixer covers essentially an entire flow cross-sectional area of the exhaust gas-carrying duct in the exhaust gas-carrying duct; or
the reactant receiving duct or at least one of the release ducts or both the reactant receiving duct and at least one of the release ducts extends essentially at right angles to an exhaust gas flow direction in the exhaust gas-carrying duct; or
the reactant injection unit injects reactant essentially at right angles to the exhaust gas flow direction in the exhaust gas-carrying duct; or
any combination of the mixer covers essentially the entire flow cross-sectional area of the exhaust gas-carrying duct in the exhaust gas-carrying duct, and the reactant receiving duct or at least one of the release ducts or both the reactant receiving duct and at least one of the release ducts extends essentially at right angles to an exhaust gas flow direction in the exhaust gas-carrying duct, and the reactant injection unit injects reactant essentially at right angles to the exhaust gas flow direction in the exhaust gas-carrying duct.

16. An exhaust system in accordance with claim 15, further comprising:
    a diesel oxidation catalytic converter upstream of the mixer; or
    a catalytic converter or a particle filter system or both a catalytic converter and a particle filter system downstream of the mixer for selective reduction; or
    any combination of a diesel oxidation catalytic converter upstream of the mixer, a catalytic converter downstream of the mixer for selective reduction and a particle filter system downstream of the mixer for selective reduction.

17. An exhaust system in accordance with claim 16, wherein an exhaust gas flow direction in the catalytic converter or in the particle filter system and an exhaust gas flow direction in the diesel oxidation catalytic converter are directed essentially in the same direction or are essentially at right angles to one another or are directed essentially opposite one another.

18. An exhaust gas mixer for mixing exhaust gas, flowing in an exhaust gas-carrying duct of an internal combustion engine, with reactant injected into the exhaust gas-carrying duct, the mixer comprising a mixer body comprising:
    a reactant receiving duct;
    an exhaust gas inlet opening arrangement with a plurality of exhaust gas inlet openings leading to the reactant receiving duct;
    a first release duct leading away from the reactant receiving duct in a first direction, the first release duct comprising a release duct opening for release of a reactant/exhaust gas mixture from the mixer body;
    a second release duct leading away from the reactant receiving duct in a second direction, the second direction being opposite the first direction, the reactant receiving duct having a reactant receiving end area and a release end area, the first release duct extending in the first direction away from the reactant receiving duct in the release area, the second release duct extending in the second direction away from the reactant receiving duct in the release area, wherein a flow deflection area is provided in the release end area, the flow deflection area dividing a flow of reactant and exhaust fluid in the reactant receiving duct towards the release end area such that a portion of the flow of reactant and exhaust fluid flows in the first direction in the first release duct and another portion of the flow of reactant and exhaust fluid flows in the second direction in the second release duct.

19. A mixer in accordance with claim 18, wherein the first release duct is separated from the second release duct via at least the flow deflection area.

20. A mixer in accordance with claim 18, wherein a first group of outlet openings is provided in a transition area from the reactant receiving duct to one of the first release duct and the second release duct and a second group of outlet openings is provided in the transition area from the reactant receiving duct to another one of the first release duct and the second release duct.

* * * * *